Dec. 19, 1933.  H. D. CHURCH  1,939,765
OILING MECHANISM
Filed Feb. 19, 1926
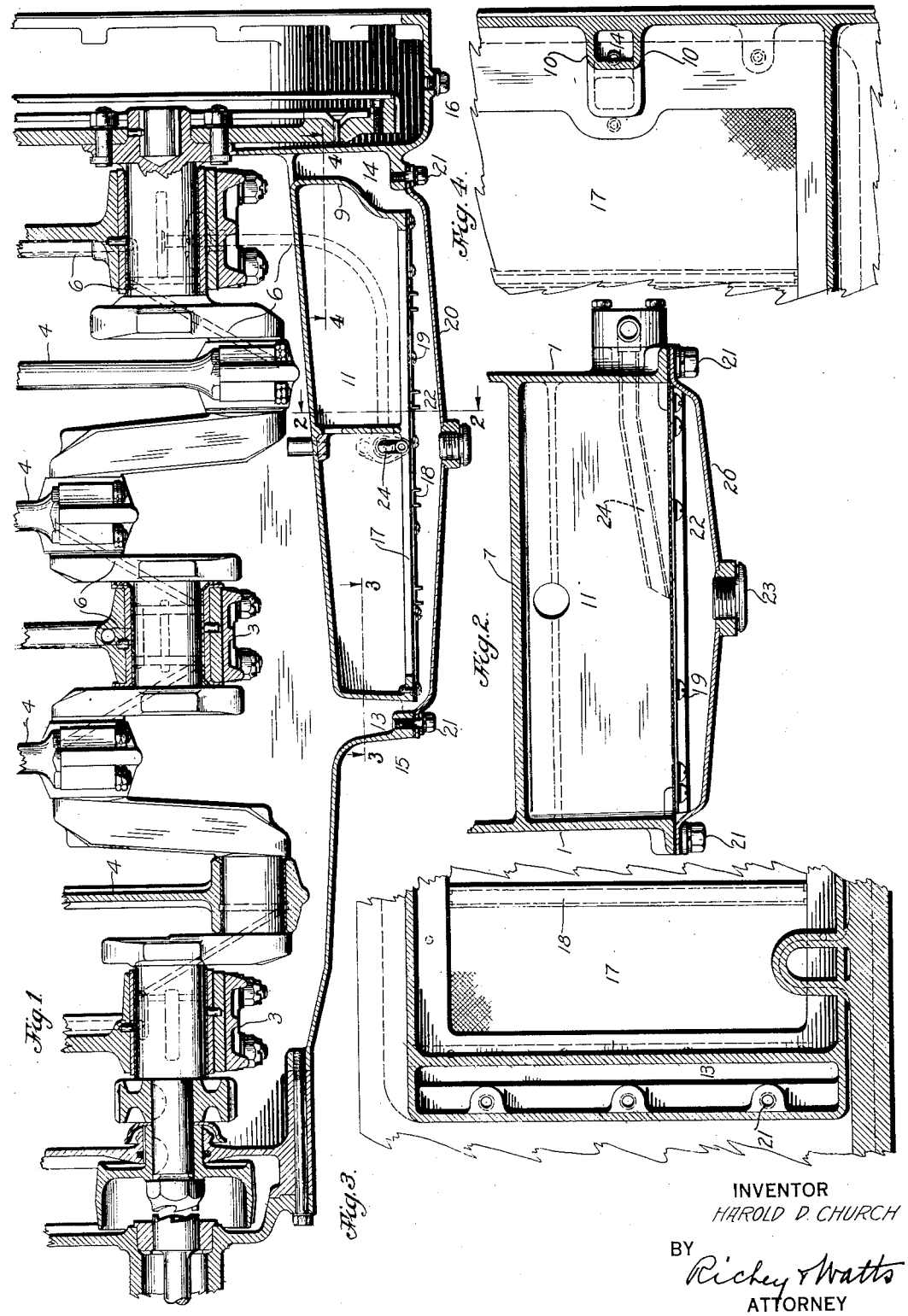
INVENTOR
HAROLD D. CHURCH
BY
Richey & Watts
ATTORNEY Patented Dec. 19, 1933

1,939,765

UNITED STATES PATENT OFFICE 1,939,765

OILING MECHANISM

Harold D. Church, Cleveland Heights, Ohio, assignor to The White Motor Company, Cleveland, Ohio, a corporation of Ohio Application February 19, 1926. Serial No. 89,315

6 Claims. (Cl. 184—6)

This invention relates to oiling mechanism for reciprocating engines, particularly to internal combustion engines, and more particularly relates to an improved means for separating the lubricating oil from foreign matter.

It is an object of this invention to provide a means which will efficiently separate the lubricant from foreign matter.

Another object is to provide a separating means which may be readily cleaned.

Other objects will hereinafter appear.

It is common in internal combustion engines, such as are used in motor cars, to lubricate the moving parts from a reservoir of oil usually carried in the engine base or crankcase, the lubricant being pumped or splashed upon the bearings to be lubricated. After lubricating the bearings and cylinder walls, the oil returns to the crank case carrying with it carbon, dirt, water, gasoline and other harmful foreign substances. These substances accumulate and mix with the lubricant, traveling therewith through the circulatory system, and cause undue wear of the motor parts, as well as impairing the lubricating efficiency of the oil.

In the patent to E. J. Gulick, No. 1,305,355, issued June 3, 1919, a means is disclosed for separating lubricating oil from the foreign matter present in an automobile crank case. In this patent is shown a sump or settling chamber into which the oil flows from the engine bearings, in which the sediment may settle and from which it may be removed. Above the settling chamber the oil is permitted to pass through strainers and then into a chamber from which it is drawn by a pump to again lubricate the parts of the mechanism.

The present invention is in part an improvement on the apparatus shown in the Gulick patent and will more efficiently separate the oil from the foreign matter and which may be more conveniently made, assembled and kept clean.

The invention will be better understood from a description of one practical embodiment thereof illustrated in the accompanying drawing in which—

Fig. 1 is a central, longitudinal section of an automobile crank case;

Fig. 2 is a transverse section of the lower part thereof on line 2—2 of Fig. 1;

Fig. 3 is a fragmentary plan view, partly in section, taken on line 3—3 of Fig. 1; and Fig. 4 is a fragmentary plan view of another section taken on line 4—4 of Fig. 1.

A crank case is illustrated generally at 1 and is most conveniently cast. Within the crank case is the usual crank shaft 2 supported in bearings 3 and operated by piston rods 4. Oil is supplied to the different bearings by a pump 5 from which the oil is conducted to the bearings through ducts 6.

This is the conventional pressure system of lubrication.

In the lower part of the crank case a wall 7 is provided extending from side to side of the crank case and sloping slightly from the rear end of the crank case to a point slightly forward of the middle thereof. At the forward end of the wall 7 a depending wall 8, likewise extending from side to side of the crank case, reaches to the bottom thereof. At the rear end of the wall 7, a narrow wall 9 extends downwardly to the bottom of the crank case to which it is integrally joined by walls 10, forming a passage from the interior of the crank case casting to the exterior thereof. The walls 7, 8 and 9, together with the sides of the crank case, form a compartment 12 closed at the sides and top and open at the bottom. A vent opening into the crank case is provided in the top of the compartment. This compartment may be provided with one or more baffle plates 11 as shown, strengthening the crank case and preventing splashing of the oil in compartment 12. Preferably the walls and baffle plates are cast integral with the lower half of the crank case, although they may be formed in any desired manner.

Drain passages 13 and 14 are thus provided between the end walls 8, 9 and 10 and the downwardly extending walls 15 and 16 of the crank case proper. These passages are open at their lower ends as indicated.

The open bottom of the compartment above described is covered by a strainer 17 made of wire mesh or other foraminous material which may be reinforced by sheet metal channels 18 or the like and which is secured about the edges of the bottom opening by screws 19.

A cover plate 20 which may be conveniently made of pressed sheet metal is secured to the lower part of the crank case to cover the open bottom of the compartment and to form a receiving chamber in communication with the ends of the passages 13 and 14 and with the compartment. The cover is secured in any suitable and readily detachable manner, as by means of screws 21 threaded into bosses on the lower part of the crank case.

It will be seen that oil returning from the bearings will run down through passages 13, or if the forward end of the engine is elevated, through passage 14, into the space 22 within the cover plate and thence upward through strainers 17 into chamber 12. The strainers prevent the passage of solid particles of foreign material therethrough and the space 22 forms a sump in which water and other foreign matter may accumulate. Preferably this sump is provided with a drain plug 23 which may be removed to drain out the accumulated water and sediment or to remove the oil from the crank case.

A suction pipe 24 extends through the side of the crank case into chamber 12 and is connected with the inlet of the oil pump 5 by which the lubricant is withdrawn from the chamber and again circulated to the moving pipes of the motor.

When it is desired to clean the strainer it is only necessary to remove screws 21 and cover 20 after which the strainer may be brushed or otherwise cleaned without being removed from position. As the strainer is firmly held by screws 19 there is very little danger of the same becoming damaged in cleaning as it easily might if removed from the motor.

By the arrangement of the strainers and cover plate the surfaces against which both bear can be machined simultaneously, thus materially reducing the labor expended in the manufacture of the motor.

I claim:

1. A motor lubricating mechanism comprising a crank case, a suction compartment having closed sides in said crank case and forming a structural part of said case, a settling chamber therebelow, a substantially horizontal strainer between said compartment and chamber and a cover plate coextensive with said strainer and forming the bottom of said chamber.

2. A motor lubricating mechanism comprising a crank case, a suction compartment therein forming an integral part thereof having closed sides and open at the bottom, a settling chamber below said compartment, a strainer between said compartment and chamber, and a circulating pump having its inlet in said suction chamber and above said strainer.

3. An engine lubricating system including a substantially flat strainer permanently secured throughout its entire periphery to the lowest part of an engine crank case, and a cover below the strainer conducting oil to the lower side thereof.

4. In a lubricant circulating system, oil cleaning means comprising, in combination, a crank case casting comprising an open bottomed portion and an open bottomed enclosure therein and integral therewith, horizontally spaced outer and inner rims of corresponding outline defining said bottom openings, each of said rims including a substantially horizontal bottom face, said faces lying in a common plane, a strainer bottom secured to said face of said inner opening and a liquid-tight bottom secured to said face of said outer opening, said liquid-tight bottom being dished downwardly out of contact with said inner rim and strainer.

5. In an internal combustion engine, a crankcase including a removable lower portion forming an oil pan, an open bottom suction chamber within said crankcase, a substantially flat strainer having its outer edge secured about the open bottom of said suction chamber, and a removable cover plate secured to said oil pan below said strainer whereby unobstructed access to the entire lower surface of said strainer is obtained when said cover plate is removed.

6. In an internal combustion engine, a crankcase having side walls and a bottom wall with an opening in the bottom wall, a suction chamber disposed in said crankcase above the opening in the bottom wall and including top and end walls integral at their side edges with the walls of said crankcase, an end wall of said suction chamber being spaced from the walls of said crankcase to form a passage therebetween extending down and below the suction chamber, a flat screen secured at its edges to the bottom of said suction chamber and completely enclosing the same, and a removable cover plate secured to said crankcase below said suction chamber.

HAROLD D. CHURCH.